United States Patent [19]
Umierski

[11] Patent Number: 6,129,066
[45] Date of Patent: Oct. 10, 2000

[54] ENGINE PISTON HAVING A GAS TURBULENCE GENERATING SURFACE

[75] Inventor: Markus Umierski, Stolberg, Germany

[73] Assignee: FEV Motorentechnik GmbH, Aachen, Germany

[21] Appl. No.: 09/404,155

[22] Filed: Sep. 27, 1999

[30] Foreign Application Priority Data

Sep. 25, 1998 [DE] Germany .......................... 198 44 070
Dec. 10, 1998 [DE] Germany .......................... 198 56 909
Mar. 3, 1999 [DE] Germany .......................... 199 09 112

[51] Int. Cl.$^7$ ................................................ F02F 3/28
[52] U.S. Cl. ............................................... 123/193.6
[58] Field of Search ............................. 123/193.6, 657, 123/659, 660, 661

[56] References Cited

U.S. PATENT DOCUMENTS

| | | | |
|---|---|---|---|
| 4,162,661 | 7/1979 | Nakanishi et al. | 123/193.6 |
| 4,294,207 | 10/1981 | May | 123/661 |
| 6,019,079 | 2/2000 | Sakurahara et al. | 123/193.6 |

*Primary Examiner*—Marguerite McMahon
*Attorney, Agent, or Firm*—Venable; Gabor J. Kelemen

[57] ABSTRACT

A piston for an internal-combustion engine has a longitudinal axis, a crown and an outer crown face. The crown face includes a dished depression; a surface region surrounding the dished depression and being elevated relative thereto; and a plurality of substantially radially extending clefts subdividing the surface region into a plurality of elevated partial surface regions.

10 Claims, 3 Drawing Sheets

ENGINE PISTON HAVING A GAS TURBULENCE GENERATING SURFACE

CROSS REFERENCE TO RELATED APPLICATION

This application claims the priority of German Application Nos. 198 44 070.0 filed Sep. 25, 1998, 198 56 909.2 filed Dec. 10, 1998 and 199 09 112.9 filed Mar. 3, 1999, which are incorporated herein by reference.

BACKGROUND OF THE INVENTION

In piston-type internal-combustion engines, whether they are externally ignited or operate with a self-ignition of the fuel mixture, the main requirements are high specific performance, low pollutant emission and low fuel consumption. A shift of the operating point towards the higher loads, accompanied by a simultaneous reduction of the stroke volume ("downsizing") was found to assist in lowering the fuel consumption in the partial load run of piston-type internal-combustion engines.

Externally ignited piston-type internal-combustion engines have been provided with a charging device, preferably an exhaust gas turbocharger for obtaining uniform torque and output values despite a smaller stroke volume as compared to conventional engines. In such an engine the tendency of a disadvantageous knocking increases with increasing charging grade and thus with increasing terminal compression pressures and terminal temperatures. For this purpose the turbocharged engines conventionally are driven with a smaller compression ratio than comparable, naturally aspirating engines. A lower compression ratio, however, adversely affects the degree of efficiency of the thermodynamic process.

To remedy the above-discussed problem, internal-combustion engines have been constructed which have a shiftable crankshaft for varying the compression ratio. Such an arrangement permits the engine to run in partial load conditions with a high compression ratio and a lean mixture and in full load conditions with a stoichometric mixture and a low compression ratio.

To be able to use conventional catalysts in internal-combustion engines of the above-outlined type, during the leaner operation the calibration of the ignition moment/air ratio has to be selected such that only a small nitrogen oxide (NO) emission results. This, however, is conditioned on a combustion process with a superior lean run capability.

As concerns thermodynamic considerations, a lean operational mode and a high compression ratio is advantageous in the full load condition as well. For this purpose the engine has to be designed such that it has a sufficient lean-run capability to ensure that the raw NO emission is limited and that the operation is free from misses at a sufficient distance from the lean-run boundary. Further, in externally ignited engines the tendency to knock has to be reduced by means of the usual concepts.

The known combustion chamber designs required for such a purpose in lean-running engines are borrowed either from four-valve piston engine designs which are generally used in personal automobiles and which are provided with "tumble" intake ports to ensure the desired turbulence by the time combustion starts, or they are based on two-valve piston engines which operate with an "intake twist". In either case, the outer face of the piston crown which essentially determines the shape of the combustion chamber is as "smooth" as possible, that is, it is free from discontinuities (breaks, fissures, etc. in the smooth surface), because such discontinuities are considered to disadvantageously affect the combustion process.

In piston-type internal-combustion engines which operate on self-ignition, for example, diesel engines with direct fuel injection, a high turbulence is desirable to reduce the emission of carbon black (soot).

SUMMARY OF THE INVENTION

It is an object of the invention to provide an improved piston for an internal-combustion engine which, in external ignition systems, ensures a significantly reduced tendency to knocking as well as an increased lean-run capability and a reduced HC emission, and in self-igniting systems, especially in diesel engines, ensures a reduction of the carbon black emission.

This object and others to become apparent as the specification progresses, are accomplished by the invention, according to which, briefly stated, the piston for an internal-combustion engine has a longitudinal axis, a crown and an outer crown face. The crown face includes a dished depression; a surface region surrounding the dished depression and being elevated relative thereto; and a plurality of substantially radially extending clefts subdividing the surface region into a plurality of elevated partial surface regions.

According to the invention, the twisting motion of the incoming gases about the cylinder axis is changed by means of the clefts in the piston crown surface into vigorous turbulences as the piston moves upwardly, that is, the gases will not flow in the combustion chamber as directed streams. Such a twisting motion of the gas about the cylinder axis is present as a more or less pronounced residual twist in case of a tumble flow, particularly in case of an originally directed, inner cylinder flow predetermined by a high-degree intake twist. Even if the gases are introduced into the cylinder in a tumble flow, very frequently a residual twist is present which, by means of the configuration according to the invention, may be effectively dissolved into turbulences so that, as the combustion starts, a rapid flame propagation is made possible. By virtue of such an arrangement, the knock-prone combustion chamber regions which are remote from the spark plug are also rapidly reached by the flame front. It is a further advantage of the invention that the elevated surface regions are reduced in the vicinity of the cylinder wall and thus the HC emission also diminishes. The increase of turbulence in the wall zone of the dished depression leads to an improved mixture formation in diesel engines and thus to a reduced carbon black emission.

Expediently, the clefts have a maximum depth which corresponds to the depth of the dished depression. Dependent on the overall configuration of the combustion chamber, the transitions between the elevations and the clefts may be sharp-edged or may be rounded. For this purpose the clefts are grooves having a rectangular cross section or a wavy course.

According to a further advantageous feature of the invention, at least two, preferably diametrically opposite clefts are provided which are oriented essentially transversely to the gas intake. As a result, during the upward motion of the piston the directed, twisted gas flow is caused to have a turbulent behavior both in the gas inlet region and in regions remote from the gas inlet, so that not only in the region of the spark plug but also in edge regions of the remaining elevations a gas turbulence may be produced.

According to a further advantageous feature of the invention, the dished depression and/or the clefts are positioned in the piston crown eccentrically to the piston axis. Such an asymmetrical arrangement further enhances a formation of turbulence.

In accordance with a further advantageous feature of the invention, the depth of the clefts is about 3–20% of the piston diameter. It is further advantageous to so dimension the width of the clefts and the diameter of the dished depression that the total upper surface area of the elevations is approximately 15–40% the upper crown surface area.

As a further advantageous feature of the invention, the clefts are aligned with the cylinder valves and are dimensioned such that the valves may enter thereinto as they lift off their seats. Such an arrangement is particularly advantageous in internal-combustion engines whose cylinder valves are provided with freely controllable setting drives, for example, hydraulic, pneumatic and/or electromagnetic actuators. By means of freely controllable setting drives an operation of the cylinder valves may be set to optimize the engine run and/or the combustion process. By coordinating the clefts with the engine valves, it is feasible to at least partially open the cylinder valves even when the piston is still in its upper dead center position.

DESCRIPTION OF THE PREFERRED EMBODIMENTS

Figure 1:
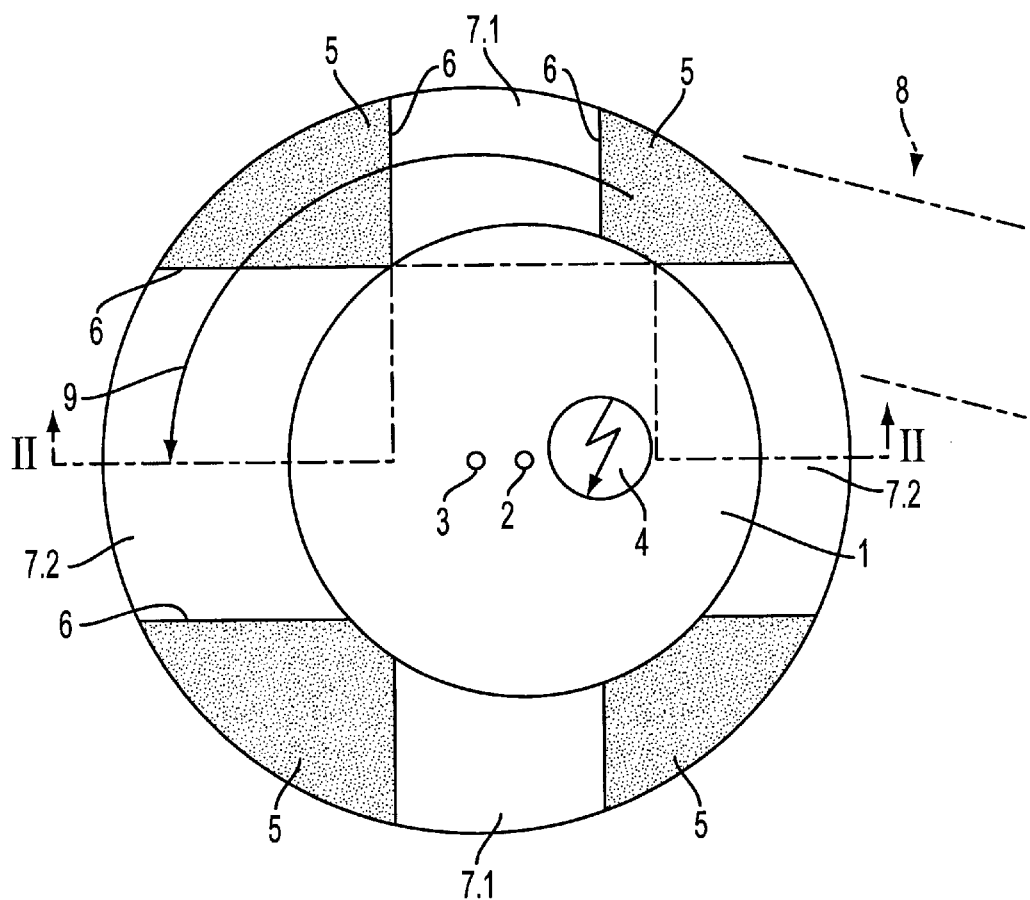
FIG. 1 is a top plan view of a piston crown according to a preferred embodiment of the invention.

FIG. 1 shows the outer (upper) face of a piston crown, provided with a dished depression 1 which has the shape of a circular cylinder having a circular outer edge. The axis 2 of the cylindrical depression 1 is offset relative to the piston axis 3 in the direction of the spark plug 4. The edge contour may, however, have a different course.

The depression 1 is bordered by an elevated surface region 5 having radially oriented clefts (interruptions) 7.1, 7.2 which define sharp or rounded turbulence edges 6 of the subdivided elevated surface region 5. The clefts 7.1, 7.2 have unlike widths and are arranged asymmetrically with respect to the piston axis 3. In the embodiment shown, the clefts 7.1 shifted with respect to the piston axis 3 are narrower than the transversely extending clefts 7.2.

Figure 2:
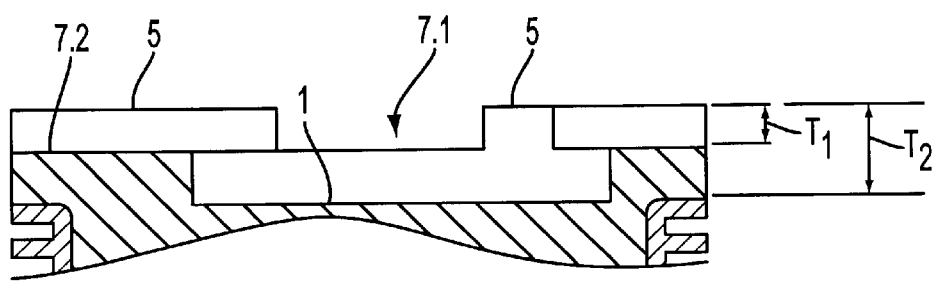
FIG. 2 is a sectional view taken along line II—II of FIG. 1.

As shown in FIG. 2, the depth $T_1$ of the clefts 7.1, 7.2 is less than the depth $T_2$ of the depression 1 and is dimensioned such that it is approximately 3–20% of the piston diameter. The width of the clefts 7.1, 7.2 is further so dimensioned that the area of the elevated surface region 5 subdivided in the shown example into four partial elevated surface regions is, dependent on the individual requirements, between 15 and 40% of the entire area of the crown surface.

FIG. 1 symbolically shows the relationship of a twisted gas flow related to the gas intake port 8 of the cylinder. During the suction stroke, that is, during downward motion of the piston and even during the beginning of its upward motion, in the cylinder chamber a twisted gas flow is obtained, as indicated by the arrow 9. Such a gas flow may be generated by the orientation of the intake ports or it may be a residual twisted flow of the differently guided gas in the cylinder, such as a tumble flow. As the upward motion of the piston continues, such a twisted flow 9 or a residual twisted flow, however, is prevented by the ever increasing influence of the turbulence edges 6. Thus, the gas flow is disturbed to such an extent that a non-directed turbulent flow in the entire combustion chamber is obtained which extends over the entire chamber width. The side faces of the clefts 7.1, 7.2 bordered by the turbulence edges 6 re-orient a continuously increasing part from the original twisted flow towards the middle of the combustion chamber. The turbulence is caused by the collision of several deflected partial flows and then the turbulent gas is deflected in the direction of the cylinder wall. As a result, during ignition of the turbulent fuel/gas mixture the flame front may rapidly expand into regions that are remote from the spark plug and thus the danger of knocking is reduced.

Figure 3:
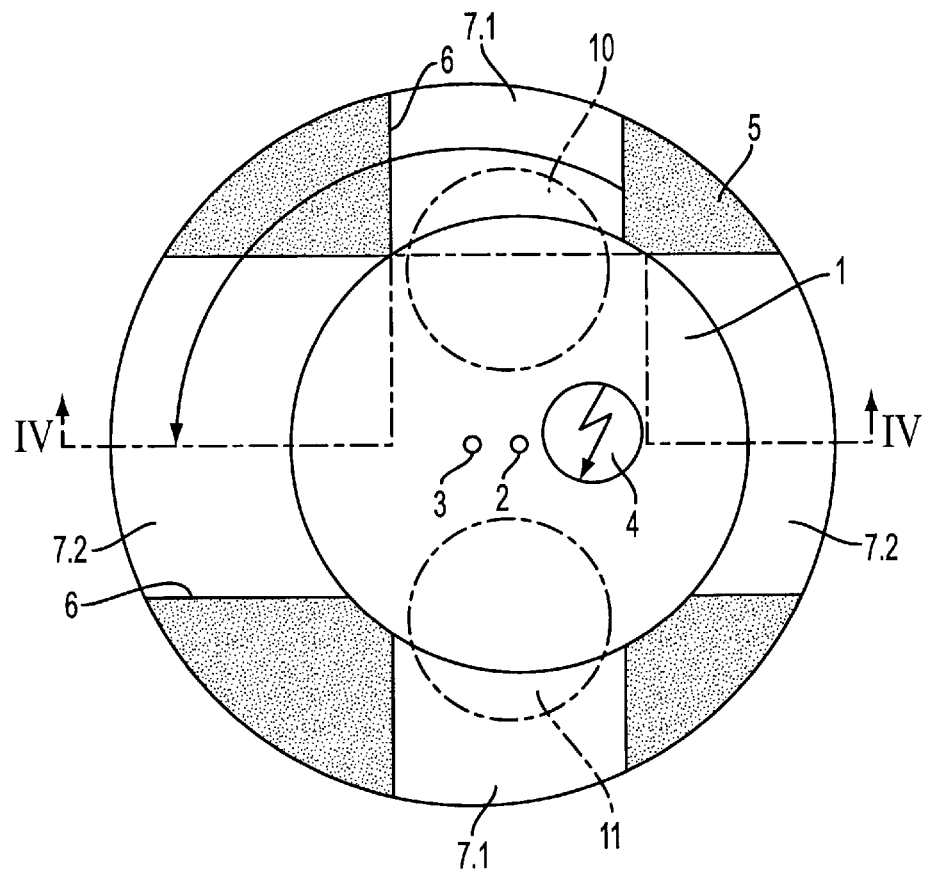
FIG. 3 is a top plan view of a piston crown according to another preferred embodiment of the invention.
Figure 4:
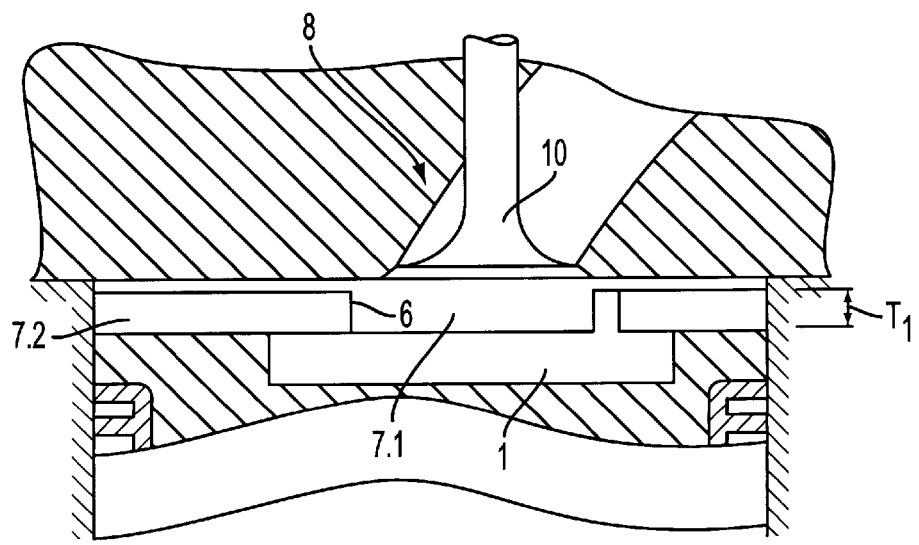
FIG. 4 is a sectional view taken along line IV—IV of FIG. 3.

FIGS. 3 and 4 show a modification of the configuration of the piston crown shown in FIG. 1 and is particularly designed for an engine cylinder having two cylinder valves. The position of the intake valve is designated at 10 and that of the exhaust valve is designated at 11.

The width of the clefts 7.1 shifted relative to the cylinder axis 3 is dimensioned such that the beginning of the opening motion of the cylinder valves may be shifted to a moment at which the piston is still in the region of its upper dead center position. In such a dimensioning the clefts 7.1 provide a free travel path for the valve head.

Figure 5:
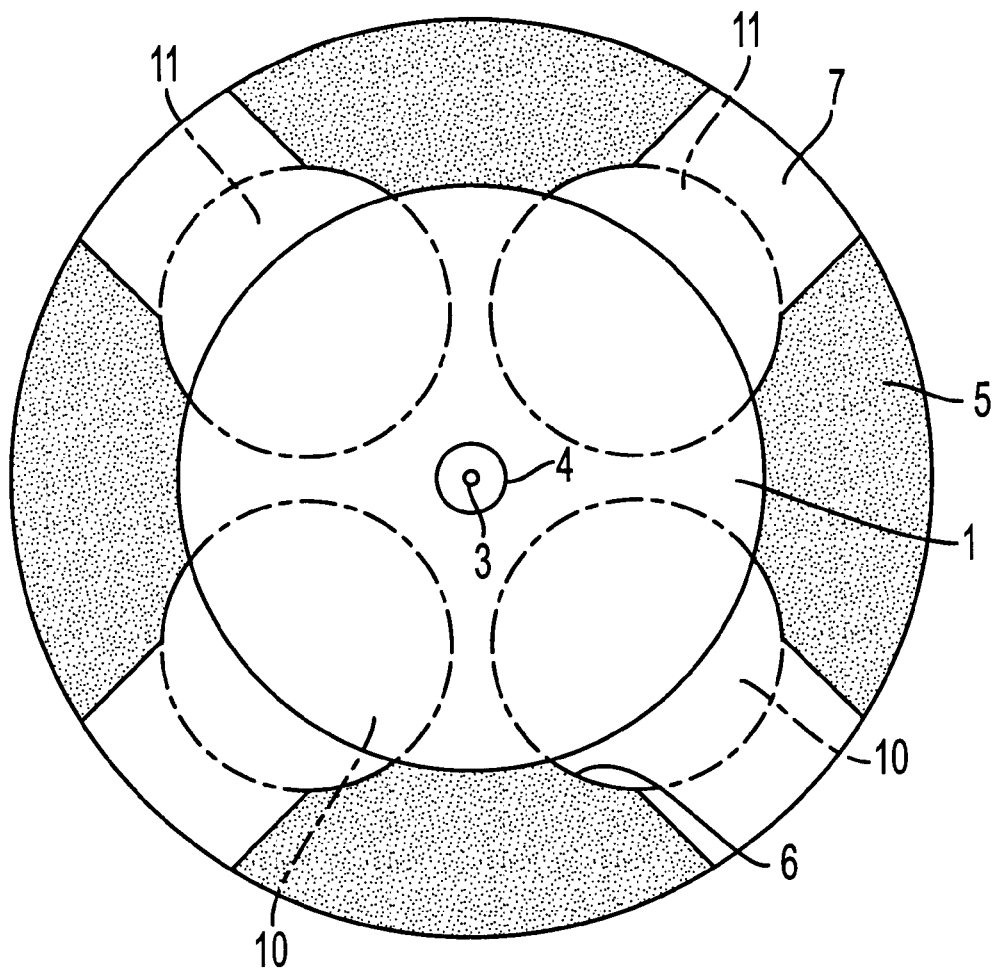
FIG. 5 is a top plan view of a piston crown of yet another embodiment of the invention further illustrating the location of four cylinder valves.

The above configuration may also find application in engines having four cylinder valves for each cylinder, that is, two intake valves 10 and two exhaust valves 11, as illustrated in FIG. 5. In the embodiment shown therein the dished depression 1 is disposed coaxially with the cylinder axis 3. An ignition device 4, such as a spark plug, an ignition jet device in a gas engine or a fuel injection valve in a self-igniting engine open into the combustion chamber in the region of the cylinder axis 3. The clefts 7.1 and 7.2 may be, as shown in FIG. 5, made as milled out portions of the elevated surface region 5. By guiding the machining tool differently, the geometry of the turbulence edges 6 may be varied such that, as shown, they extend partially radially and are partially coaxial with the cylinder valves where they are to provide a free passage therefor.

Instead of the illustrated rectangular contour of the clefts 7.1, 7.2 and the elevated surface region 5, they may have a wavy configuration. Such a wavy contour configuration may be effected by providing that the turbulence edges 6 are more or less rounded and their transition to the respective bottom faces of the clefts 7.1, 7.2 are also rounded. This may be transformed into a "real" wave shape. Instead of a cross-sectionally rectangular or wavy configuration, a sawtooth or trapezoid contour may be provided for the clefts 7.1, 7.2. Furthermore, the turbulence edges may have an alternating sharp and rounded edge.

It will be understood that the above description of the present invention is susceptible to various modifications, changes and adaptations, and the same are intended to be comprehended within the meaning and range of equivalents of the appended claims.

What is claimed is:

1. A piston for an internal-combustion engine; the piston having a longitudinal axis, a crown and an outer crown face; said crown face comprising (a) a dished depression;

(b) a surface region surrounding said dished depression and being elevated relative thereto; and (c) a plurality of substantially radially extending clefts subdividing said surface region into a plurality of elevated partial surface regions.

2. The piston as defined in claim 1, wherein said dished depression has a center and further wherein said dished depression is positioned eccentrically relative to said axis.

3. The piston as defined in claim 1, wherein two of said clefts are in alignment with one another and are laterally offset relative to said axis.

4. The piston as defined in claim 1, wherein a total upper surface area of said elevated partial surface regions is approximately between 15% and 40% of a total area of said crown face.

5. The piston as defined in claim 1, in combination with an internal-combustion engine having a cylinder accommodating said piston and a cylinder valve being aligned with at least one of said clefts; said one cleft being dimensioned such that said valve may freely extend thereinto when lifted and when said piston is situated in a region of an upper dead center position thereof.

6. The piston as defined in claim 1, wherein said dished depression has a depression depth and said clefts have a cleft depth; further wherein said cleft depth is at the most identical to said depression depth.

7. The piston as defined in claim 6, further comprising a piston diameter; said cleft depth is approximately between 3% and 20% of said piston diameter.

8. The piston as defined in claim 1, further comprising turbulence edges defined by said clefts with said elevated partial surface regions.

9. The piston as defined in claim 8, wherein said turbulence edges are sharp.

10. The piston as defined in claim 8, wherein said turbulence edges are rounded.

* * * * *